US006776381B1

United States Patent
Gisch

(10) Patent No.: US 6,776,381 B1
(45) Date of Patent: Aug. 17, 2004

(54) CUP HOLDER

(76) Inventor: Andrew H. Gisch, 8114 Briar Creek Dr., Annandale, VA (US) 22003

( * ) Notice: Subject to any disclaimer, the term of this patent is extended or adjusted under 35 U.S.C. 154(b) by 0 days.

(21) Appl. No.: 10/354,131

(22) Filed: Jan. 30, 2003

(51) Int. Cl.[7] .................................................. A47K 1/08
(52) U.S. Cl. .............................. 248/311.2; 297/188.01
(58) Field of Search ............................. 248/214, 316.8, 248/311.2, 312.1; 297/188.01

(56) References Cited

U.S. PATENT DOCUMENTS

| | | | | |
|---|---|---|---|---|
| 5,280,870 A | * | 1/1994 | Chick et al. | 248/311.2 |
| 5,671,877 A | * | 9/1997 | Yabuya | 224/282 |
| 5,702,041 A | * | 12/1997 | Sun et al. | 224/539 |
| 5,988,579 A | * | 11/1999 | Moner et al. | 248/311.2 |
| 6,039,296 A | * | 3/2000 | Nishina et al. | 248/311.2 |
| 6,059,244 A | * | 5/2000 | Bilandzic et al. | 248/311.2 |
| 6,092,776 A | * | 7/2000 | You | 248/311.2 |
| 6,361,008 B1 | * | 3/2002 | Gravenstreter | 248/311.2 |
| 6,409,136 B1 | * | 6/2002 | Weiss et al. | 248/311.2 |
| 6,409,137 B1 | * | 6/2002 | Tran | 248/311.2 |

OTHER PUBLICATIONS

US 2002/0171018 A1 (Harada) Nov. 21, 2002, "Cup Holder".*

US 2003/0025058 A1 (Dierenger et al.) Feb. 6, 2003, "Beverage Holder".*

* cited by examiner

Primary Examiner—Leslie A. Braun
Assistant Examiner—Amy J. Sterling
(74) Attorney, Agent, or Firm—Hunton & Williams LLP

(57) ABSTRACT

A cup holder insert for use in conjunction with a retractable cup holder tray is provided. The cup holder insert comprises a circular base having top and bottom rims interconnected by a side wall, the side wall having a notch area defined by a first and second wall interconnected by at least one spring element. The insert further comprises two stave elements connected to the top rim of the base by a first hinge element, the stave elements having a top and bottom portion interconnected by a second hinge element, the first and second hinge elements operating to enable selective concealment of the slave elements within the area formed by the side wall and the planes defined by the top and bottom rims of the base. Additionally, an acceleration tab is connected via a third hinge element to the top rim of the base in a position 90 degrees away from either of the two stave elements relative to the center point of a circle defined by the top rim, the third hinge element operating to enable selective concealment of the acceleration tab within the area formed by the side wall and the planes defined by the top and bottom rims of the base. At least one support tab element is connected to an inner wall of the side wall. A retainer tab connected to the bottom rim of the base for connecting the base to the retractable cup holder tray.

14 Claims, 4 Drawing Sheets

CUP HOLDER

FIELD OF THE INVENTION

This invention relates generally to a cup holder and, more particularly, to a cup holder insert for use in a mobile medium.

BACKGROUND OF THE INVENTION

Cup holders serve an essential function in our society. They enable millions of Americans to go about their daily lives without having to sacrifice immediate and ready enjoyment of their favorite beverages, which include soda, water, juice, and, of course, coffee. Particularly important are cup holders that allow us to consume beverages during transportation.

Automobile manufacturers, for example, include as a standard feature in most vehicles some form of generic or standard cup holder. One common type comprises a depression or cavity (usually part of the console design) that holds a container while occupants drive or ride. Another common type is a retractable cup holder tray that an occupant may conceal when not in use, such as within the dashboard, for example. While these common cup holders relieve most occupants from having to physically hold their containers while they drive or ride, they nonetheless suffer from several notable drawbacks.

One problem with these standard cup holders is their inability to properly accommodate cups or containers of various sizes. This is particularly troublesome in light of the ever-increasing size of common containers, such as the super-size containers available from many fast-food restaurants or convenient stores, like the Biggie™ and Big Gulp™ respectively offered by Wendy's™ restaurants and 7-11™ convenience stores, for example. Such larger containers tend to be top-heavy and thus render standard cup holders essentially useless. However, standard cup holders are so deficient that even smaller and medium size containers can be improperly retained.

Another notable problem of standard cup holders is their inability to properly prevent spillage resulting from sudden acceleration, deceleration, sharp turns, or other sudden movement of the vehicle. The results can be particularly onerous should the spillage scald the occupants or cause the driver to lose control of the vehicle.

While cup holder insert designs that attempt to cure the above problems are known in the prior art, they too suffer from several drawbacks. Typical problems include their inability to be used with standard cup holders of various sizes, and their inability to retract along with a cup holder tray when not in use.

These and other problems exist.

SUMMARY OF THE INVENTION

An object of the present invention is to overcome the aforementioned and other drawbacks existing in the prior art.

Another object of the present invention is to provide a cup holder that reduces the likelihood of spillage resulting from acceleration, deceleration, or other sudden movement of the vehicle.

Yet another object of the present invention is to provide a cup holder insert that can be stored when not in use.

Another object of the present invention is provide a retractable cup holder insert.

Another object of the present invention is to provide a retractable cup holder insert that works in conjunction with a retractable cup holder tray or other stand cup holder(s).

Yet another object of the present invention is to provide a portable cup holder insert than can be used with standard cup holder designs of various sizes and that can retract when not in use.

According to one embodiment of the invention, a cup holder is provided. The cup holder comprises a body having a top portion and a bottom portion interconnected by a side wall, and at least two stave elements.

According to another embodiment, a retractable cup holder insert is provided. The insert comprises adjustable base support means for receiving the base of a container; retractable side support means for retaining the container; and means for attaching the insert to a retractable cup holder tray.

In another embodiment of the invention, a cup holder insert for use in conjunction with a retractable cup holder tray is provided. The cup holder insert comprises: a circular base having top and bottom rims interconnected by a side wall, the side wall having a notch area defined by a first and second wall interconnected by at least one spring element; two stave elements connected to the top rim of the base by a first hinge element, the stave elements having a top and bottom portion interconnected by second hinge element, the first and second hinge elements operating to enable selective concealment of the stave elements within the area formed by the side wall and the planes defined by the top and bottom rims of the base; an acceleration tab connected via a third hinge element to the top rim of the base in a position 90 degrees away from either of the two slave elements relative to the center point of a circle defined by the top rim, the third hinge element operating to enable selective concealment of the acceleration tab within the area formed by the side wall and the planes defined by the top and bottom rims of the base; at least one support tab element connected to an inner wall of the side wall; and a retainer tab connected to the bottom rim of the base for connecting the base to the retractable cup holder tray.

The accompanying drawings, which are incorporated in and constitute a part of this specification, illustrate various embodiments of the invention and, together with the description, serve to explain the principles of the invention.

DETAILED DESCRIPTION OF THE INVENTION

Figure 1A:
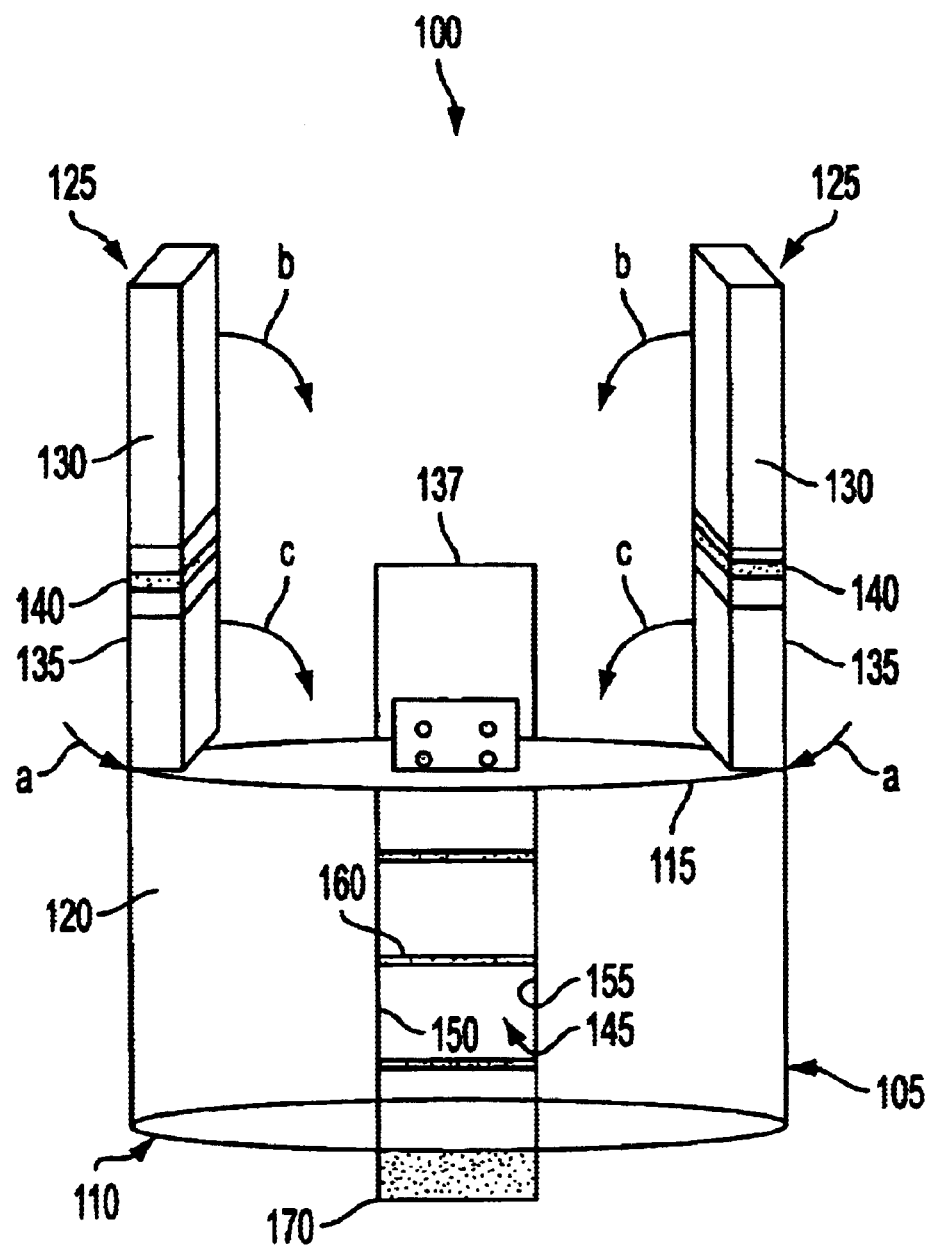
FIG. 1A is a side view of one embodiment of a cup holder according to the present invention.

Reference will now be made to the present preferred embodiments of the invention, examples of which are illustrated in the accompanying drawings in which like reference characters refer to corresponding elements.

The present invention is described in relation to a cup holder insert used in conjunction with a retractable cup holder tray commonly found in many automobiles. Nonetheless, the characteristics and parameters pertaining to the cup holder insert may be used in non-retractable standard cup holders, such as the console depressions discussed above, for example. The cup holder described and claimed herein may be used as a self-standing system, and may also be used with other moving vehicles, such as trains, buses, airplanes, and other like modes of transportation.

FIG. 1A illustrates one embodiment of a cup holder 100 according to the present invention. Cup holder 100 may comprises a self-standing cup holder, or may comprises a cup holder insert that can be used in conjunction with standard cup holder designs, such as the two discussed above. Cup holder 100 may include a base 105 having bottom and top portions 110 and 115, respectively, and a side wall 120. In one embodiment, portions 110 and 115 may be open so that base 105 comprises a cylindrical or tube-like structure. According to another embodiment, base 110 may be closed so that base 105 comprises a cup-like structure. Preferably, portions 110 and 115 comprise respective rims of base 105 having equal diameters (i.e., circular in shape), but may comprise rims having various shapes and dimensions, such as elliptical, oval, oblong, for example. In one embodiment, the diameter of the bottom rim may be less than that of the top rim, resulting therefore in a tapered side wall 120. Other shapes and dimensions are of course possible.

Figure 1B:
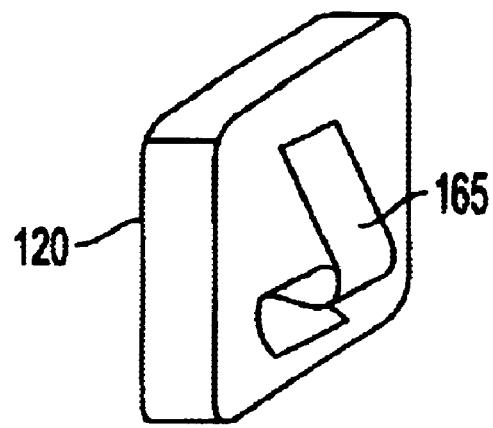
FIG. 1B is a perspective view of a support tab according to one embodiment of the present invention.

In one embodiment, base 105 may further comprise a notch area 145 defined by walls 150 and 155. In another embodiment, walls 150 and 155 may be interconnected by at least one spring element 160, which operates to urge walls 150 and 155 towards each other. This way, a container inserted into base 105 will be better retained as a result of the resistance provided by side wall 120. In another embodiment, spring element 160 may provide sufficient outward force to urge walls 150 and 155 away from each other, thereby enabling a tight fit between side wall 120 and the standard cup holder retaining base 105, for example. Thus, side wall 120 may accordingly expand or contract depending on the width of the container being retained and/or the width of the cup holder retaining base 105. Preferably, spring element(s) 160 comprises a standard spring, but may include other elastic elements such as a rubber band, for example. In another embodiment, as shown in FIG. 1B, the inner wall of base 105 may include a support element 165 that serves to further support the container being retained. In one embodiment, the inner wall of base 105 may include several support elements 165 to offer more uniform support of the container. In another embodiment, support element 165 is shaped in an "s-like" fashion (as shown in FIG. 1B) so that it may rigidly retain containers of various sizes. Other shapes are of course possible.

Figure 1C:
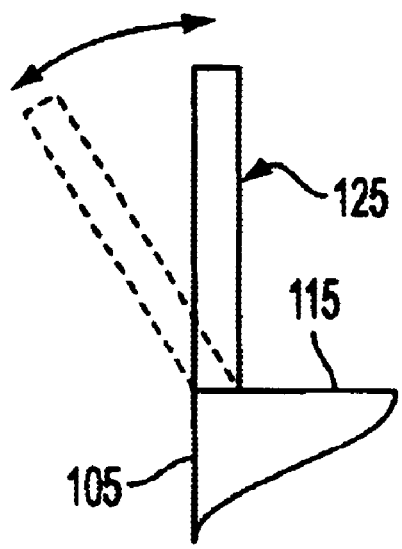
FIG. 1C is a side view of the flexible range of a stave element according to one embodiment of the present invention.

Cup holder 100 may also include stave elements 125 connected to rim 115. Stave elements 125 may cooperate with base 105 to support the container being retained. In one embodiment, at least one stave element 125 is provided to support the container. In another embodiment, as shown in FIG. 1C, stave element 125 may provide flexibility about the point of contact with rim 115 so that containers having upwardly-increasing diameters may be properly retained. Preferably, two stave elements 125 are provided (as shown in FIG. 1A) in opposite relation to each other along rim 115. Numerous stave elements may of course be provided.

In another embodiment, stave elements 125 may comprise top and bottom portions 130 and 135, respectively, which are interconnected by a hinge element 140. In another embodiment, stave elements 125 may also have a second hinge element 127 at point "a" so that each stave element 125 may pivot about point "a." Both hinge elements, therefore, may cooperate to permit stave elements 125 to fold down (or retract) into base 105, as shown by arrows b and c. Preferably, stave elements 125 should fold down (or retract) into the area formed by side wall 120 and the planes defined by rims 110 and 115. This way, the cup holder 100 of the present may—when used in conjunction with a retractable cup holder platform (see FIGS. 2A and 2B)— retract into the dashboard of the vehicle when not in use. Cup holder 200 may also include an acceleration tab 137 which cooperates with stave elements 125 to retain a container. In one embodiment, acceleration tab 137 may include a hinge element 142 that enables it to fold down (or retract) into base 105. Preferably, acceleration tab 137 is positioned on rim 115 in such a way that its face is perpendicular to the faces of stave elements 125. Put another way, acceleration tab 137 is connected to the top rim of the base in a position 90 degrees away from either of the two stave elements, relative to the center point of a circle defined by the top rim 115. Additional acceleration tabs 137 may of course be provided.

Figure 2A:
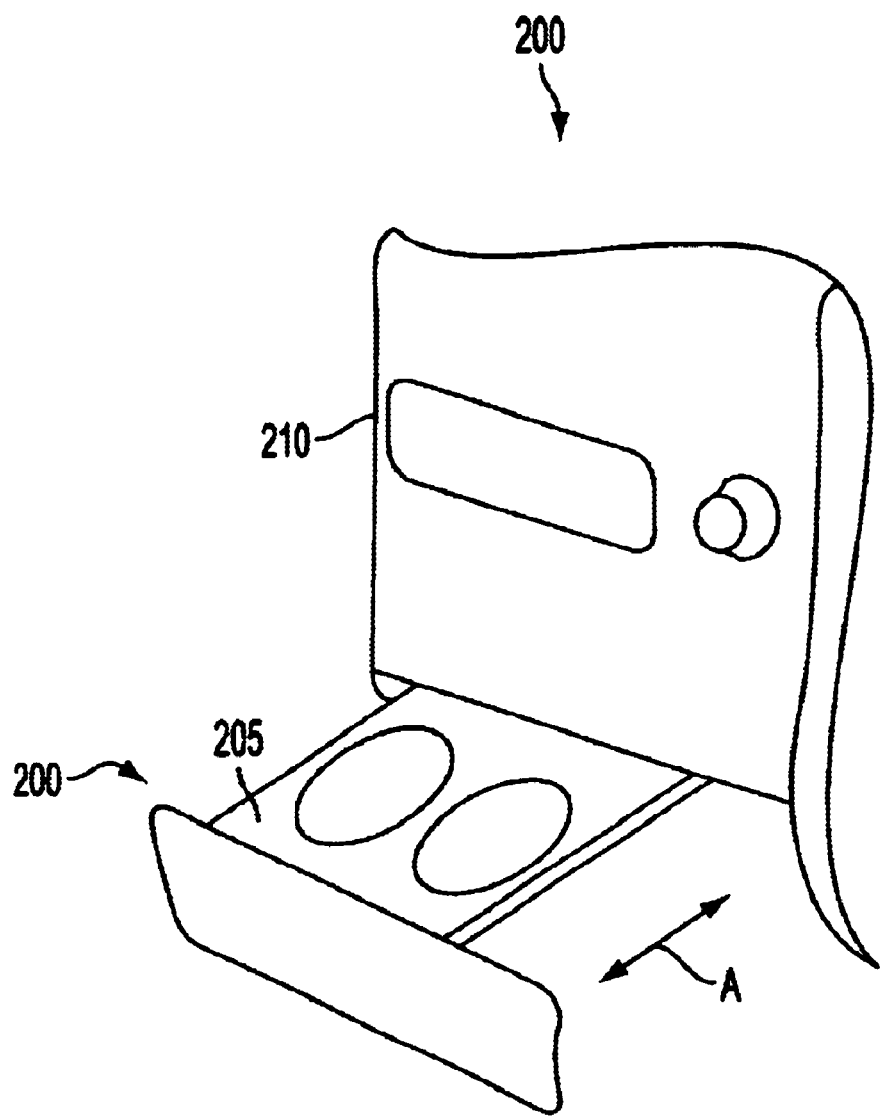
FIG. 2A is a perspective side view of a standard retractable cup holder tray.
Figure 2B:
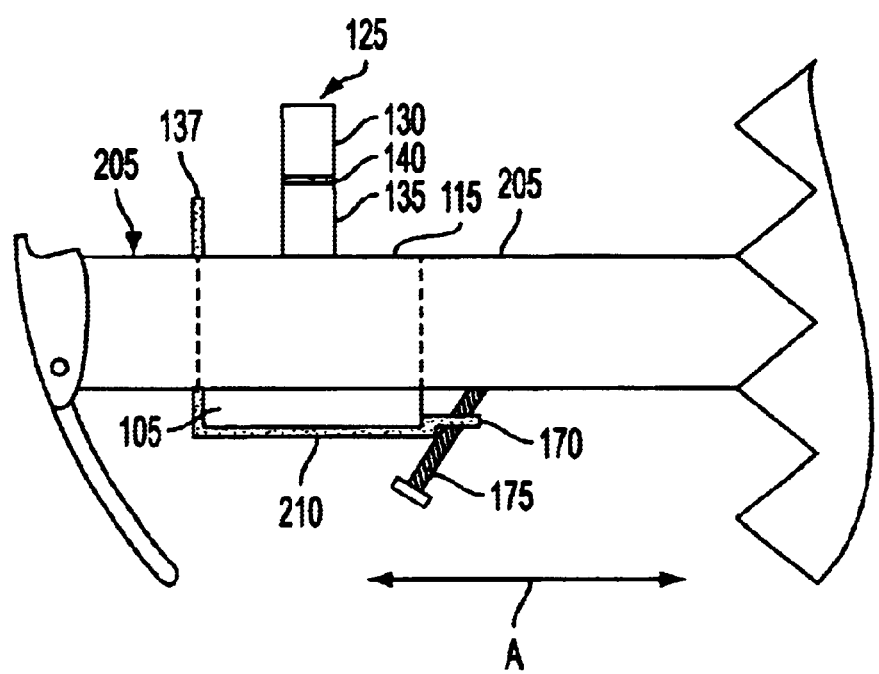
FIG. 2B is a side view diagram of one embodiment of a cup holder of the present invention used in conjunction with the retractable tray of FIG. 2A.

FIGS. 2A (prior art) and 2B illustrate a cup holder tray 200. As shown by arrow "A," cup holder tray 200 may selectively be opened for use or concealed within the dashboard 210 of the vehicle. FIG. 2B illustrates cup holder insert 100 of the present invention used in conjunction with cup holder tray 200. Preferably, cup holder 100 is positioned within tray 200 in such a way so that rim 115 is flush with platform 205. Tray 200 also comprises a floor 210 upon which the bottom rim of base 105 may rest. To ensure a rigid connection between base 105 and tray 200, a retention tab 170 may be attached to base 105. In one embodiment, tab 170 may cooperate with screw means 175 to rigidly retain insert 100 during opening and closing of tray 200, as shown in FIG. 2B. In this embodiment, screw means 175 urges against platform 205 to prevent undesired movement of base 105 and cup holder insert 100. Other retention techniques are of course possible. According to another embodiment, retention tab 170 may selectively be concealed within side wall 120 (such as with a hinge) to enable cup holder 100 to be used with other standard cup holder designs, such as the depressions or cavities discussed above. This way tab 170 will not interfere with a secure interconnection between base 105 and the standard cup holder.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A cup holder, comprising:

a body having a top portion and a bottom portion interconnected by a side wall, the side wall portion further comprising a notch area defined by first and second end portions of the side wall, at least one spring element for connecting the first and second end portions of the side wall, the at least one spring element urges the first and second end portions of the side wall towards each other;

at least two stave elements connected to the top portion of the body, the at least two stave elements cooperating to retain a cup or container inserted into the body; and an acceleration tab connected to the top portion of the body via a hinge element.

2. The cup holder of claim 1 wherein the top portion comprises a rim.

3. The cup holder of claim 1 wherein the bottom portion comprises a rim.

4. The cup holder of claim 1 wherein each of the at least two stave elements may retract to an area bounded by the side wall and the planes defined by the top and bottom portions.

5. The cup holder of claim 1 wherein the at least two stave elements comprises a first and bottom portion interconnected by hinge means.

6. The cup holder of claim 1 wherein the at least two stave elements are connected to the body by hinge means.

7. The cup holder of claim 1 wherein the acceleration tab is connected to the top portion of the base at a predetermined distance away from the at least two stave elements.

8. The cup holder of claim 1 wherein the acceleration tab may retract to an area bounded by the side wall and the planes defined by the top and bottom portions of the base.

9. The cup holder of claim 1 wherein the side wall further comprises at least one support tab.

10. The cup holder of claim 1 further comprising a retention tab connected to the bottom portion of the base for attaching the base to a retractable cup holder tray.

11. The cup holder of claim 1 wherein a retention tab cooperates with screw means to retain the base.

12. A retractable cup holder insert, comprising:
   adjustable base support means for receiving the base of a container;
   at least two retractable stave elements for retaining the container;
   means for attaching the insert to a retractable cup holder tray; and
   an acceleration tab connected to a top portion of the insert via a hinge element.

13. A cup holder insert for use in conjunction with a retractable cup holder tray, comprising:
   a circular base having top and bottom rims interconnected by a side wall, the side wall having a notch area defined by a first and second wall interconnected by at least one spring element;
   two stave elements connected to the top rim of the base by a first hinge element, the stave elements cooperating to retain a cup or container inserted into the circular base and having a top and bottom portion interconnected by second hinge element, the first and second hinge elements operating to enable selective concealment of the stave elements within the area formed by the side wall and the planes defined by the top and bottom rims of the base;
   an acceleration tab connected via a third hinge element to the top rim of the base in a position 90 degrees away from either of the two stave elements relative to the center point of a circle defined by the top rim, the third hinge element operating to enable selective concealment of the acceleration tab within the area formed by the side wall and the planes defined by the top and bottom rims of the base;
   at least one support tab element connected to an inner wall of the side wall; and
   a retainer tab connected to the bottom rim of the base for connecting the base to the retractable cup holder tray.

14. The cup holder of claim 1 wherein the at least two stave elements are moveable so as to retain cups or containers of varying size.

* * * * *